US010191168B2

(12) United States Patent
Peng et al.

(10) Patent No.: US 10,191,168 B2
(45) Date of Patent: Jan. 29, 2019

(54) AVA COMPLIANT PRE-STACK FREQUENCY SPECTRUM ENHANCEMENT OF SEISMIC DATA

(71) Applicant: CGG SERVICES SAS, Massy (FR)

(72) Inventors: Can Peng, Fulshear, TX (US); Arash Jafargandomi, Horley (GB); Henning Hoeber, East Grinstead (GB); James Cooper, Redhill (GB); Gordon Poole, East Grinstead (GB)

(73) Assignee: CGG SERVICES SAS, Massy (FR)

( * ) Notice: Subject to any disclaimer, the term of this patent is extended or adjusted under 35 U.S.C. 154(b) by 74 days.

(21) Appl. No.: 15/402,830

(22) Filed: Jan. 10, 2017

(65) Prior Publication Data
US 2017/0199289 A1 Jul. 13, 2017

Related U.S. Application Data

(60) Provisional application No. 62/360,997, filed on Jul. 12, 2016, provisional application No. 62/315,753, (Continued)

(51) Int. Cl.
*G01V 1/36* (2006.01)
*G01V 1/30* (2006.01)
(Continued)

(52) U.S. Cl.
CPC .............. *G01V 1/362* (2013.01); *G01V 1/282* (2013.01); *G01V 1/307* (2013.01); *G01V 1/375* (2013.01);
(Continued)

(58) Field of Classification Search
CPC ........ G01V 1/282; G01V 1/307; G01V 1/362; G01V 2210/512; G01V 2210/632
See application file for complete search history.

(56) References Cited

U.S. PATENT DOCUMENTS

| 2004/0199330 | A1  | 10/2004 | Routh et al. |
| 2012/0026830 | A1  | 2/2012  | Wang et al. |
| 2014/0102694 | A1* | 4/2014  | Hargreaves ............ G01V 1/003 166/250.01 |

FOREIGN PATENT DOCUMENTS

| WO | 2015185991 A2 | 12/2015 |
| WO | 2016/075550 A1 | 5/2016 |

OTHER PUBLICATIONS

Extended European Search Report in corresponding European Application No. E 17 30 5024 dated Jun. 7, 2017.
(Continued)

*Primary Examiner* — Bryan Bui
(74) *Attorney, Agent, or Firm* — Patent Portfolio Builders PLLC

(57) ABSTRACT

Generating spectrally enhanced seismic data expresses seismic data as a convolution of reflectivity and a seismic source wavelet. This seismic source wavelet varies over a sampling interval and defining a total amount of energy over the sampling interval. An enhanced seismic source wavelet that is a single-valued energy spike that yields the total amount of energy over the sampling interval is generated. In addition, the reflectivity is modified to preserve amplitude variation with angle. The reflectivity is convoluted with the enhanced seismic source wavelet and residual energy is added to the convolution to generate the spectrally enhanced seismic data.

20 Claims, 10 Drawing Sheets

Related U.S. Application Data filed on Mar. 31, 2016, provisional application No. 62/277,523, filed on Jan. 12, 2016.

(51) Int. Cl.
*G01V 1/28* (2006.01)
*G01V 1/37* (2006.01)

(52) U.S. Cl.
CPC .. *G01V 2210/512* (2013.01); *G01V 2210/632* (2013.01)

(56) References Cited

OTHER PUBLICATIONS

F. A. Bellina, et al.; "Enhancing the vertical resolution of surface georadar data"; Journal of Applied Geophysics, vol. 68, No. 1, XP026099924; May 1, 2009; pp. 26-35.
M. Smith et al., "Extending Seismic Bandwidth Using the Continuous Wavelet Transform", first break, Jun. 2008, vol. 26, pp. 97-102.
W. Alemie et al., "High-Resolution Three-Term AVO Inversion by Means of a Trivariate Cauchy Probability Distribution", GEOPHYSICS, May-Jun. 2011, vol. 76, No. 3, pp. R43-R55.
A.J. Berkhout, "Least-Squares Inverse Filtering and Wavelet Deconvolution", GEOPHYSICS, Dec. 1977, vol. 42, No. 7, pp. 1369-1383.
S.H. Bickel et al., "Plane-Wave Q Deconvolution", GEOPHYSICS, Sep. 1985, vol. 50, No. 9, pp. 1426-1439.
P.B.A. Caprioli et al., "Combination of Multi-Component Streamer Pressure and Vertical Particle Velocity—Theory and Application to Data", 74th EAGE Conference & Exhibition incorporating SPE EUROPEC 2012, Copenhagen, Denmark, Jun. 4-7, 2012.
J.P. Castagna et al., "Principles of AVO Crossplotting", The Leading Edge, Apr. 1997.
J. Hu et al., "Poststack Migration Deconvolution", GEOPHYSICS, May-Jun. 2001, vol. 66, No. 3, pp. 939-952.
A. Jafargandomi et al., "AVA Compliant Pre-Stack Spectral Enhancement", SEG International Exposition and 86th Annual Meeting, 2016, SEG Expanded Technical Abstracts, pp. 1844-1848.
E. Jenner et al., "Extending the Useable Bandwidth of Seismic Data with Tensor-Guided, Frequency-Dependent Filtering", first break, Jan. 2016, vol. 34, pp. 69-74.
S.J. Lancaster et al., "Fractal Layering as a Model for Coloured Inversion and Blueing", EAGE 69th Conference & Exhibition, London, UK, Jun. 11-14, 2007.
T. Lin et al., "Spectral Decomposition of Time VS Depth-Migrated Data", 83rd Annual International Meeting, SEG, 2013, SEG Expanded Technical Abstracts, pp. 1384-1388.
G.F. Margrave, "Theory of Nonstationary Linear Filtering in the Fourier Domain with Application to Time-Variant Filtering", GEOPHYSICS, Jan.-Feb. 1998, vol. 63, No. 17, pp. 244-259.
J.P. Neep, "Time Variant Coloured Inversion and Spectral Blueing", EAGE 69th Conference & Exhibition, London, UK, Jun. 11-14, 2007.
T. Nemeth et al., "Least-Squares Migration of Incomplete Reflection Data", GEOPHYSICS, Jan.-Feb. 1999, vol. 64, No. 1, pp. 208-221.
C. Peng et al., "Structurally Conformal Resolution Enhancement with Joint Sparse Inversion", 78th EAGE Conference & Exhibition 2016, Vienna, Austria, May 30-Jun. 2, 2016.
Sacchi, "Reweighting Strategies in Seismic Deconvolution", Geophysical Journal International, 1997, vol. 129, pp. 651-656.
D. Trad et al., "Latest Views of the Sparse Radon Transform", GEOPHYSICS, Jan.-Feb. 2003, vol. 68, No. 1, pp. 386-399.
P. Wang et al., "Premigration Deghosting for Marine Streamer Data Using a Bootstrap Approach in Tau-P Domain", 75th EAGE Conference & Exhibition incorporating SPE EUROPEC 2013, London, UK, Jun. 10-13, 2013.
P. Wang et al., "Premigration Deghosting for Marine Towed Streamer Data Using a Bootstrap Approach", SEG Annual Meeting, Las Vegas, Nevada, 2012, SEG Expanded Technical Abstracts.
D.N. Whitcombe et al., "Frequency Dependent, Structurally Conformable Filtering", SEG Annual Meeting, Las Vegas, Nevada, 2008, SEG Expanded Technical Abstracts, pp. 2617-2621.
Y. Xie et al., "3D Prestack Depth Migration with Compensation for Frequency Dependent Absorption and Dispersion", SEG International Exposition and Annual Meeting, Houston, Texas, 2009, SEG Expanded Technical Abstracts.
K. Xin et al., "3-D Tomographic Q Inversion for Compensating Frequency Dependent Attenuation and Dispersion", SEG International Exposition and Annual Meeting, Houston, Texas, 2009, SEG Expanded Technical Abstracts.
F. Yang et al., "Time Variant Amplitude and Phase Dispersion Correction for Broadband Data", SEG Annual Meeting, New Orleans, Louisiana, 2015, SEG Expanded Technical Abstracts.
H. Yang et al., "Dual Domain Filters Based Texture and Structure Preserving Image Non-Blind Deconvolution", Computer Vision Foundation, CVPR2015.
R. Zhang et al., "Seismic Sparse-Layer Reflectivity Inversion Using Basis Pursuit Decomposition", GEOPHYSICS, Nov.-Dec. 2011, vol. 76, No. 6, pp. R147-R158.
Y. Zhang et al., "A Stable and Practical Implementation of Least-Squares Reverse Time Migration", SEG Annual Meeting, Houston, Texas, 2013, SEG Expanded Technical Abstracts, pp. 3716-3720.

\* cited by examiner

AVA COMPLIANT PRE-STACK FREQUENCY SPECTRUM ENHANCEMENT OF SEISMIC DATA

CROSS REFERENCE TO RELATED APPLICATIONS

This application claims priority and benefit from U.S. Provisional Patent Application Nos. 62/277,523, filed Jan. 12, 2016, for "3D Structure Conformal Resolution Enhancement Based on Joint Sparse Inversion", 62/315,753, filed Mar. 31, 2016 for "AVA Compliant Pre-Stack Spectral Enhancement" and 62/360,997, filed Jul. 12, 2016 for "Spatially Consistent Q-Compensation", the entire contents of which are incorporated herein by reference.

TECHNICAL FIELD

Embodiments of the subject matter disclosed herein generally relate to methods and systems for imaging and characterizing a subsurface using a seismic data acquisition system.

BACKGROUND

Seismic data acquisition surveys include both land and seabed surveys that utilize seismic receivers arranged in a pattern or grid on either the land or seabed. Seismic sources or seismic shots are created by towing or driving one or more seismic signal generators such as a seismic gun along tow lines or paths, e.g., shot lines. The seismic signal generators are then actuated at multiple locations along the tow lines or paths and the resulting seismic signals are recorded at the seismic receivers on the cables or nodes. The recorded seismic signals are then processed to yield a seismic image of the subsurface below the seismic data acquisition grid.

Seismic images with broad bandwidth are in demand for high resolution imaging of subsurface structures that may lead to more accurate interpretation. However, bandwidth shrinkage of acquired seismic data is present for many reasons including non-uniform attenuation of the medium, free-surface ghost waves, and the bandwidth limitation of the seismic source itself. Many broadband technologies have been developed to address these issues. To remove the free-surface ghost, deghosting technologies have been proposed. Although deghosting can reverse ghost-induced bandwidth shrinkage, deghosting leaves frequency attenuation effects, resulting in slanted spectra with a peak frequency shifted towards the low end.

To compensate for frequency-dependent attenuation, various amplitude Q compensation methods have been proposed. Seismic waves travelling through an attenuative medium experience a loss of energy to that medium via absorption. This absorption affects both the amplitude and phase spectrum of the seismic signal. Moreover, the absorption effect is dispersive, as higher frequencies are more rapidly affected than lower frequencies. The tendency of a particular medium to absorb seismic energy is characterised by its quality factor, Q. This is a dimensionless number, proportional to the fraction of energy lost to the medium per cycle of the seismic wave. In seismic data processing, it is important to compensate for this absorption in order to render an accurate image of the Earth's subsurface reflectivity. Key challenges involved in achieving this include the determination of appropriate Q values for the data in question, as well as implementing the spectral compensation for a given Q in a robust way. However, current methods struggle with a loss in high frequency due to the stabilization requirements of the regularization and the difficulty in obtaining accurate Q models. Moreover, in principle, both deghosting and amplitude Q compensation cannot deal with bandwidth limitation due to the seismic source.

One approach to further enhance resolution is to remove residual source signature and non-stationary Q effects by deconvolution. Deconvolution methods can be classified into two main categories. The first category is filtering-based deconvolution in which a Wiener filter is calculated based on white spectrum reflectivity and minimum phase wavelet assumptions, or minimum entropy of reflectivity assumption, and applied to the seismic traces. However, these methods are very sensitive to parameters in the inverse filter estimation and can amplify noise. The second category is inversion-based deconvolution in which a seismic wavelet is estimated first and the linear convoluting equations are solved as a second inversion problem. Due to the limited bandwidth of the wavelet, deconvolution is an ill-posed problem and regularization is required to overcome the non-uniqueness of the solution.

Compared with traditional L2 regularization that constrains the total energy of the deconvolved trace, sparse regularization gives a simpler and less noisy model that can explain the observations. Performing deconvolution trace-by-trace may introduce inconsistencies and structural nonconformity among neighbouring traces, especially when sparse regularization is used.

In seismic data processing, the phase and amplitude components of the spectral compensation may be applied either simultaneously, or independently at separate stages of the processing sequence (in the latter case, the two components being termed phase-only and amplitude-only Q compensation). Conventional processing flows may, for example, apply the phase correction prior to migration of the data, and the amplitude correction after migration (either pre-stack or post-stack). Alternatively, the Q compensation may be incorporated directly into a Q migration algorithm.

Conventional post-migration amplitude-only Q compensation algorithms typically follow an amplitude damping model. There may be a number of limitations associated with such algorithms. First, an algorithm may not distinguish between seismic signal and background noise, boosting both indiscriminately. Sparse inversion has been proposed as a method for mitigating the influence of noise in Q compensation. Second, an algorithm may be applied only in a 1D sense, which does not guarantee spatial consistency across the geological structures in the seismic data volume. Third, migration shifts spectra to frequencies lower than that of the unmigrated signal in the presence of steep geological dips. A dip-dependent factor has been proposed to correct for this effect. A conventional post-migration Q compensation algorithm may not take this correction factor into account, although a Q migration algorithm may handle steeply dipping events correctly.

SUMMARY

Embodiments are directed to method and systems to a pre-stack amplitude versus angle (AVA) compliant spectral broadening approach based on non-stationary wavelet deconvolution. The algorithm employs AVA coupling in the pre-stack domain to broaden the spectra of all traces in each angle gather simultaneously and in an AVA preserving manner. Application of the algorithm to synthetic and real data illustrates that the characteristics of all AVA classes are preserved and that the spectra of all angles are enhanced and better balanced.

Embodiments are also directed to methods and systems to removing source wavelet and residual non-uniform absorption (Q) effects to enhance the spatial resolution of seismic images after de-ghosting and amplitude attenuation compensation. A new resolution enhancement method incorporates structural conformity constraints and sparse regularization into an inversion-based deconvolution. The method provides a resolution-enhanced broader bandwidth image with improved signal-to-noise ratio and geological coherence. Acoustic impedance inversion was carried out after resolution enhancement, and a more detailed and coherent impedance volume was obtained.

Embodiments are also directed to methods and system to a technique for Q compensation utilizing sparse inversion, for a known Q. By solving the sparse inversion problem in a model domain, the method achieves a 3D spatially consistent Q compensation. Moreover, by a particular choice of a model domain in which signal and incoherent noise may be discriminated, the method avoids boosting incoherent noise in the Q compensation. Additionally, by a particular choice of a model domain, dip-dependent spectral shifting due to migration may be corrected in the Q compensation.

Exemplary embodiments are directed to a method for generating spectrally enhanced seismic data. Seismic data for a subsurface are obtained, and the seismic data are modeled as linear function of a reflectivity and a seismic source wavelet. The seismic source wavelet varies over a sampling interval, and modelling the seismic data is constrained by an amplitude variation with reflection angle. In one embodiment, the seismic source wavelet is a time-dependent convolutional wavelet matrix containing a plurality of time-dependent and angle-dependent wavelets.

In one embodiment, linearized amplitude variation with angle coefficients is included in the reflectivity to preserve amplitude variation with angle in the spectrally enhanced seismic data. In one embodiment, the reflectivity is modified in accordance with an applied structural consistency in the subsurface to reduce noise in the spectrally enhanced seismic data. In one embodiment, the expressed function or convolution of reflectivity and the seismic source wavelet is solved using non-stationary estimates of time-dependent and angle-dependent wavelets and a sparse inversion algorithm to generate an estimated reflectivity. In one embodiment, wherein the method further comprises the seismic data are compensated for subsurface absorption using a sparse inversion.

An enhanced seismic source wavelet containing a single-valued spike is identified, and the reflectivity is convoluted with the enhanced seismic source wavelet to generate spectrally enhanced seismic data. In one embodiment, the enhanced seismic source wavelet is identified by calculating an area under the seismic source wavelet over the sampling interval and identifying the enhanced seismic source wavelet to enclose the area over the sampling interval. In one embodiment, convoluting the reflectivity with the enhanced seismic source wavelet to generate spectrally enhanced seismic data further includes adding residual energy representing noise in the seismic data to the convolution of the reflectivity and the enhanced seismic wavelet to generate spectrally enhanced seismic data.

Exemplary embodiments are also directed to a computer-readable medium containing computer-executable code that when read by a computer causes the computer to perform a method for generating spectrally enhanced seismic data. The method includes obtaining seismic data for a subsurface, and modelling the seismic data as linear function of a reflectivity and a seismic source wavelet. The seismic source wavelet varies over a sampling interval, and modelling the seismic data is constrained by an amplitude variation with reflection angle. An enhanced seismic source wavelet containing a single-valued spike is identified, and the reflectivity is convoluted with the enhanced seismic source wavelet to generate spectrally enhanced seismic data.

Exemplary embodiments are directed to a computing system for generating spectrally enhanced seismic data. The computing system includes a storage device storing recorded seismic data for a subsurface. The computing system also includes a processor in communication with the storage device. The processor is configured to model the seismic data as linear function of a reflectivity and a seismic source wavelet. The seismic source wavelet varies over a sampling interval, and modelling the seismic data is constrained by an amplitude variation with reflection angle. In one embodiment, the seismic source wavelet is a time-dependent convolutional wavelet matrix containing a plurality of time-dependent and angle-dependent wavelets. The processor is further configured to identify an enhanced seismic source wavelet comprising a single-valued spike and to convolute the reflectivity with the enhanced seismic source wavelet to generate spectrally enhanced seismic data.

In one embodiment, the processor is further configured to include linearized amplitude variation with angle coefficients in the reflectivity to preserve amplitude variation with angle in the spectrally enhanced seismic data. In another embodiment, the processor is further configured to modify reflectivity in accordance with an applied structural consistency in the subsurface to reduce noise in the spectrally enhanced seismic data. In one embodiment, the processor in identifying the enhanced seismic source wavelet calculates an area under the seismic source wavelet over the sampling interval and identifies the enhanced seismic source wavelet to enclose the area over the sampling interval. In one embodiment, the processor after convoluting the reflectivity with the enhanced seismic source wavelet to generate spectrally enhanced seismic data adds residual energy representing noise in the seismic data to the convolution of the reflectivity and the enhanced seismic wavelet to generate spectrally enhanced seismic data.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
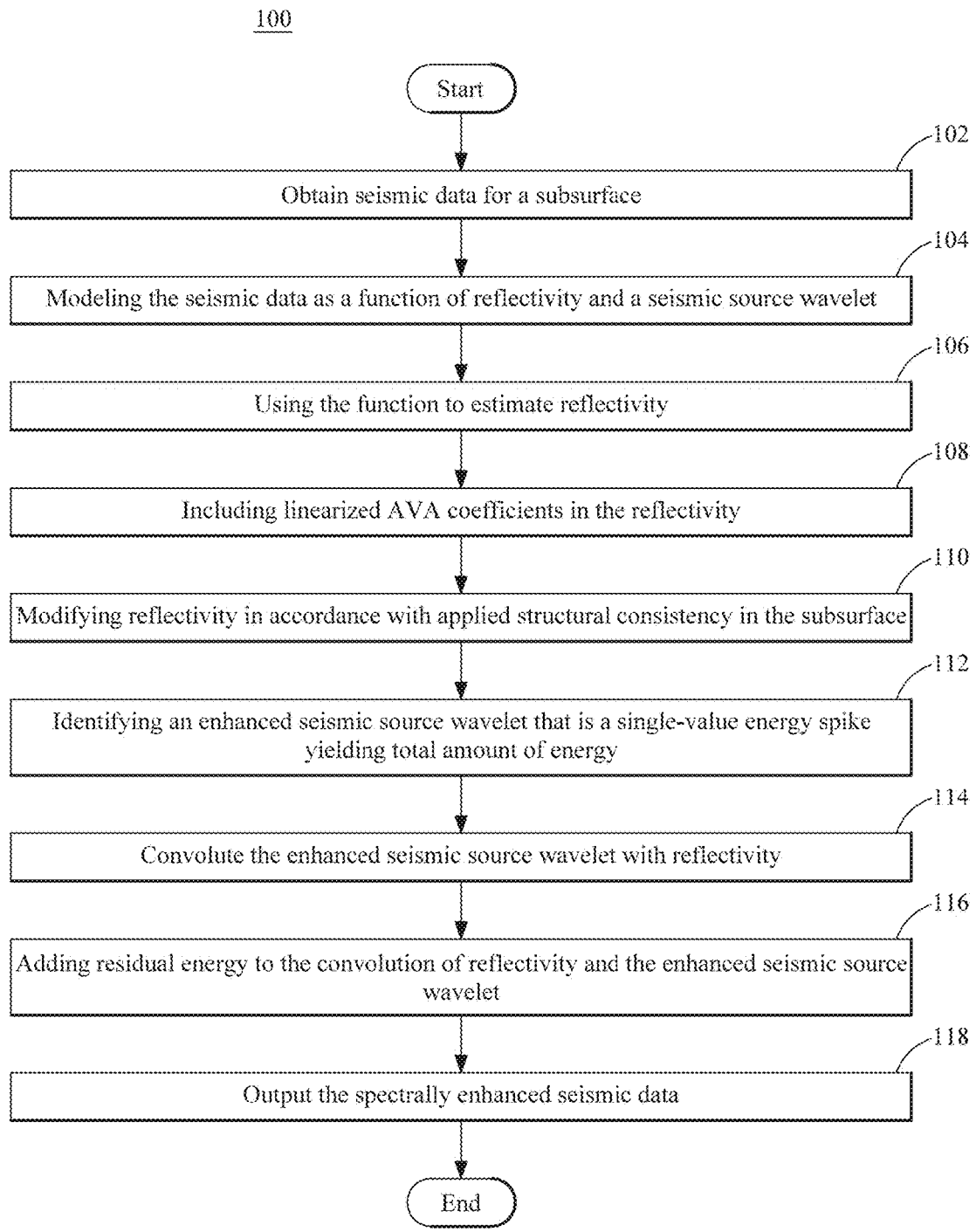
FIG. 1 is a flowchart of an embodiment of a method for generating spectrally enhanced seismic data.

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to local activity taking place within the area of a seismic survey. However, the embodiments to be discussed next are not limited to this configuration, but may be extended to other arrangements that include regional activity, conventional seismic surveys, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Exemplary embodiments are directed to systems and methods that utilize modeling, e.g., calculating or converting, seismic data as a function of reflectivity and the source signature. In one embodiment, modelling includes using a deconvolution of seismic data into the reflectivity and the source signature. The reflectivity and source signature are then each separately corrected or modified before being recombined through convolution. The reflectivity is corrected to remove noise resulting from the inconsistencies in the geology of the surface, and the source signature, i.e., the wavelet, is corrected in the time domain while preserving energy to correct for weak frequencies at the high and low ends of the frequency spectrum. The corrected reflectivity and source signature are re-combined or convoluted to yield seismic data having a corrected spectrum in the frequency domain. In particular, the spectrum is flat across all frequencies including frequencies at the low end and the high end of the frequency band.

Seismic data are obtained from a seismic survey of a subsurface. Suitable seismic surveys include any type of seismic survey including land-based surveys, towed streamer arrays and seabed surveys. The seismic data are obtained using one or more seismic receivers receiving both source signals and reflected signals from one or more seismic sources. Any suitable types of seismic sources and seismic receivers known and available in the art can be used. The seismic data, which include a plurality of wavelets, provide an illustration or image of the subsurface and the geological structures in the subsurface. These geological structures indicate the location of gas and petroleum deposits in the subsurface. Therefore, the seismic data are used to image the subsurface and geological deposits and to guide exploration, drilling and extraction of the desired gas and petroleum deposits.

The frequency spectrum of the seismic data is not flat and is weak at the high end and the low end. This weakness can result, for example, from the geology of the subsurface (high end). Exemplary embodiments boost the seismic data at either the high or low end of the frequency spectrum individually or at both the high and low end of the frequency spectrum simultaneously. The result is seismic data having a frequency spectrum that is flat across all frequencies. The high and low end frequency data are boosted without damaging the AVA of the seismic data, which is an important component of the seismic data that indicates the location of hydrocarbons. In addition, the high and low end frequency data are boosted without boosting environmental noise present in the seismic data.

Having obtained the seismic data, the seismic data are modelled as linear function of a reflectivity and a seismic source wavelet. In one embodiment, this modelling of the seismic data is constrained by an amplitude variation with reflection angle. In one embodiment of modelling, the seismic data are represented as a convolution of the reflectivity and the source signature. In one embodiment, the non-stationary convolutional model at a given offset or angle in the time-domain is described as $$d_t = W_t r_t \tag{1}$$

Here $d_t$ and $r_t$ are the seismic data and reflectivity vectors, i.e., the reflectivity, and $W_t$ is the time-dependent convolutional wavelet matrix, i.e., the source signature:

$$W_t = \begin{bmatrix} w_1^1 & & & & & \\ w_2^1 & w_1^2 & & & & \\ w_3^1 & w_2^2 & w_1^3 & & & \\ & w_3^2 & w_2^3 & \ldots & & \\ & & w_3^3 & \ldots & \ldots & w_1^n \\ & & & & \ldots & w_2^n \\ & & & & & w_3^n \end{bmatrix} \tag{2}$$

For each wavelet in the matrix, the superscript is the time-index of the data and the subscript represents the wavelet time sample. In one embodiment, the time and angle-dependent wavelets are obtained through statistical wavelet estimation and well-tie.

Having defined the relationship or function among the seismic data, reflectivity and source signature, the AVA in the seismic data is preserved. In addition, the equation is modified for the pre-stack domain. In one embodiment, equations 1 and 2 are extended to the pre-stack domain with AVA coupling by letting:

$$d_{t,\theta} = W_{t,\theta} G_{t,\theta} r_t, \tag{3}$$

or, $$d_{t,\theta} W_{t,\theta} r_{t,\theta} \tag{4}$$

Here the applied coefficient $G_{t,\theta}$ describes polynomial AVA coupling across offsets of angles. By using this coupling, the algorithm favors events that are present across all angles. Exemplary embodiments solve equation 3 for $r_t$ using a non-stationary estimate of time- and angle-dependent wavelets $W_{t,\theta}$ and a sparse inversion algorithm with L1 norm. The estimated $r_t$ is then converted to $r_{t,\theta}$ by applying the same AVA coefficients $G_{t,\theta}$ used to solve Equation 3. Different levels of sparseness may be introduced to enhance the spectral bandwidth of the estimated reflectivity.

In one embodiment, the reflectivity portion of the seismic data is modified to reduce noise in the seismic data. In one embodiment, the reflectivity portion is modified to make the geology in the subsurface structurally consistent. The inversion proceeds gather by gather, but structural consistency is applied to avoid boosting noise and to improve lateral continuity of $r_{t,\theta}$ in a dip compliant manner. In one embodiment, structural consistency is applied to the model parameters in 3D through warping, i.e., applying time-dependent time-shifts to align adjacent traces within a moving spatial window and subsequent stacking.

To correct for weakness in the high and low frequencies of the seismic data, the source signature is modified while preserving or conserving the energy in the source signature. The correction is made in the time domain through modifications to the wavelet. In one embodiment, the wavelet varies only temporally, although the wavelet may vary spatially as well, and zero phase is assumed in all examples. The area under the source signature or wavelet over the sampling interval represents the energy of the source signature. Therefore, this energy or area under the source signature is determined, and a modified wavelet, i.e., a desired broadband non-stationary wavelet, is created that has the same determined area over the sampling interval. In particular, the modified wavelet is a single value spike extending over the sampling interval such that this new area under this spike or wavelet is the same as the determined area. Therefore, the modified wavelet maintains the energy of the original source signature. This single spike wavelet in the time domain corresponds to a flat frequency spectrum across all frequencies in the frequency domain. In general, the enhanced seismic wavelet may have a broader bandwidth than the source wavelet, such that the output seismic data have an enhanced spectrum. Therefore, in one embodiment, the enhanced wavelet is a spike; however, other forms or shapes are suitable for the enhanced wavelet, such as a band pass filter or low pass filter, e.g., a filtered spike).

The modified wavelet, i.e., modified or corrected source signature is then convoluted with the reflectivity, either the original reflectivity or the reflectivity modified for a structurally consistent geology. The result is spectrally enhanced seismic data. In one embodiment, the spectrally enhanced data are formed through:

$$\bar{d}_{t,\theta}=\bar{W}_{t,\theta}r_{t,\theta}, \quad (5)$$

where $\bar{w}$ is the desired broadband non-stationary wavelet, i.e., the modified wavelet or source signature, such that energy is preserved according to:

$$\text{Energy}[\bar{W}_{t,\theta}]=\text{Energy}[W_{t,\theta}] \quad (6)$$

This constraint preserves relative AVA. Neglecting $G_{t,\theta}$ in Equation 3 leads to an uncoupled deconvolution of multiple traces. Even in the uncoupled case, the AVA behavior of the input data is preserved through the energy preserving wavelet scaling; however, an additional spectral-angle-balancing may be required to achieve similar results to the coupled case. The AVA coefficients $G_{t,\theta}$ in the deconvolution introduce coupling within the multiple traces in a common depth point (CDP) gather that guide the spectral enhancement towards a stationary seismic spectrum in the angle domain. Effects such as residual normal moveout (NMO)-stretch and non-stationarity of the seismic wavelet are corrected with this deconvolution approach. Residual Q effects are partially corrected, as the wavelet has no lateral variations. By using an AVA coupled formulation boosting is avoided where data are not AVA consistent across the pre-stack data. n the prestack domain seismic data suffers from stretching effect (which gets stronger with increasing offset) due to migration or NMO (Normal-Move-Out) correction. Modifying the wavelet as described in equation 6 leads to de-stretching of the seismic data through broadening of the data spectrum.

In one embodiment, the method compensates for residual energy that is not accounted for in the convolution. This residual energy is noise, and for real data, a noise term is added in Equation 4:

$$d_{t,\theta}=W_{t,\theta}r_{t,\theta}+e_{t,\theta} \quad (7)$$

This noise term is the residual of the inversion. This noise term is added back to the enhanced data to avoid any potential energy leakage within the original bandwidth of data due to the spectral broadening. Equation 5 is then replaced by:

$$\bar{d}_{t,\theta}=\bar{W}_{t,\theta}r_{t,\theta}+e_{t,\theta} \quad (8)$$

This effectively preserves parts of the seismic data, such as vertical faults, that are not fully described by the convolutional model. By adding the noise back, the AVA within the existing bandwidth is naturally preserved and any frequency enhanced part of the spectrum is AVA consistent in the sense of the coupling used.

The resulting spectrally enhanced seismic data with or without the addition of a residual energy term, provide an improved image of the subsurface in the area of the seismic survey. The image is improved and enhanced across all frequencies and maintains the desired AVA, which provides an indication and image of gas and hydrocarbon deposits in the subsurface. The seismic data and associated images of the subsurface are used to locate and evaluate gas and hydrocarbon deposits and to direct operations for the extraction of these deposits.

The transformed or frequency enhanced seismic data are used to generate an image of the surveyed subsurface. The image represents a geological parameter of the earth in the surveyed subsurface, and this parameter may be the earth reflectivity, impedance, velocity, amplitude versus offset (AVO) (AVO or amplitude variation with offset is the general term for referring to the dependency of the seismic attribute, amplitude, with the distance between the source and receiver (the offset)), etc. This image is important for many reasons for the oil and gas industry. One reason is the selection of a site for drilling a well. An accurate image of the subsurface provides clues to the location of the resource (e.g., oil and/or gas) and thus, suggests to those skilled in the art where to drill the well. Another reason is related to the monitoring of an existing production well. It is known that the production wells slowdown in time and thus, it is necessary to inject various fluids to rejuvenate the well production. The images discussed above may be used to monitor the production well, and these images will offer clues about the timing for injecting the above noted fluids, and also in which well to inject them.

Referring initially to FIG. 1, an exemplary embodiment is directed to a method for generating spectrally enhanced seismic data 100. Seismic data for a subsurface are obtained 102. Any suitable method or methods for conducting either a land-based or marine seismic survey and collecting the seismic data can be used to obtain the seismic data. The obtained seismic data are expressed or represented as a function, e.g., convolution of reflectivity and a seismic source wavelet 104. This separates the reflectivity from the seismic source wavelet to facilitate separate modifications or enhancements to the reflectivity and the seismic source wavelet. The reflectivity, i.e., the reflectivity in the subsurface, is a vector. In one embodiment, modelling the seismic data is constrained by an amplitude variation with reflection angle. The seismic source wavelet varies over a sampling interval and defines a total amount of energy over the sampling interval. Therefore, the area under the seismic source wavelet over the sampling interval corresponds to the total energy in the seismic source wavelet. In one embodiment, the seismic source wavelet is a time-dependent convolutional wavelet matrix comprising a plurality of time-dependent and angle-dependent wavelets.

With the seismic data deconvoluted into the reflectivity and the seismic source wavelet, each can be modified or enhanced to improve or enhance the frequency spectrum of the seismic data. The convolution expression is used to estimate the reflectivity 106. In one embodiment, the expressed convolution of reflectivity and the seismic source wavelet is solved using non-stationary estimates of time-dependent and angle-dependent wavelets and a sparse inversion algorithm to generate the estimated reflectivity. In order to preserve AVA in the seismic data, including the spectrally enhanced seismic data, linearized amplitude variation with angle coefficients are included in the reflectivity 108, i.e., the estimated reflectivity. As inconsistencies in the geology of the subsurface can produce noise in the seismic data, the reflectivity is modified in accordance with an applied structural consistency in the subsurface to reduce this noise in the seismic data including the spectrally enhanced seismic data 110.

The source wavelet is then modified in the time-domain to correct for weakness in the seismic data in the frequency domain at the low end and high end of the frequency band. An enhanced seismic source wavelet that is a single-valued energy spike that yields the total amount of energy over the sampling interval is identified 112. Therefore, the total energy of the original seismic source wavelet is preserved in the enhanced seismic source wavelet. As the total amount of energy in the seismic source wavelet is represented by the total area under the seismic source wavelet over the sampling interval, identifying the enhanced seismic source wavelet is accomplished by calculating this area under the seismic source wavelet over the sampling interval, and identifying the enhanced seismic source wavelet to enclose the same area over the sampling interval, i.e., preserving area preserves energy.

The reflectivity is convoluted with the enhanced seismic source wavelet to generate the spectrally enhanced seismic data 114. The original or modified reflectivity can be used. As the seismic data include noise, i.e., energy, that is not included in the convolution, residual energy representing noise in the seismic data can be added to the convolution of the reflectivity and the enhanced seismic source wavelet to generate spectrally enhanced seismic data 116. The spectrally enhanced seismic data can then be output 118 or saved. For example, the spectrally enhanced seismic data can be used to generate an image of the geological structures of the subsurface that are displayed to a user. In addition, the spectrally enhanced seismic data can be used to determine other properties of the subsurface or to guide hydrocarbon exploration or extraction activities.

Figure 2:
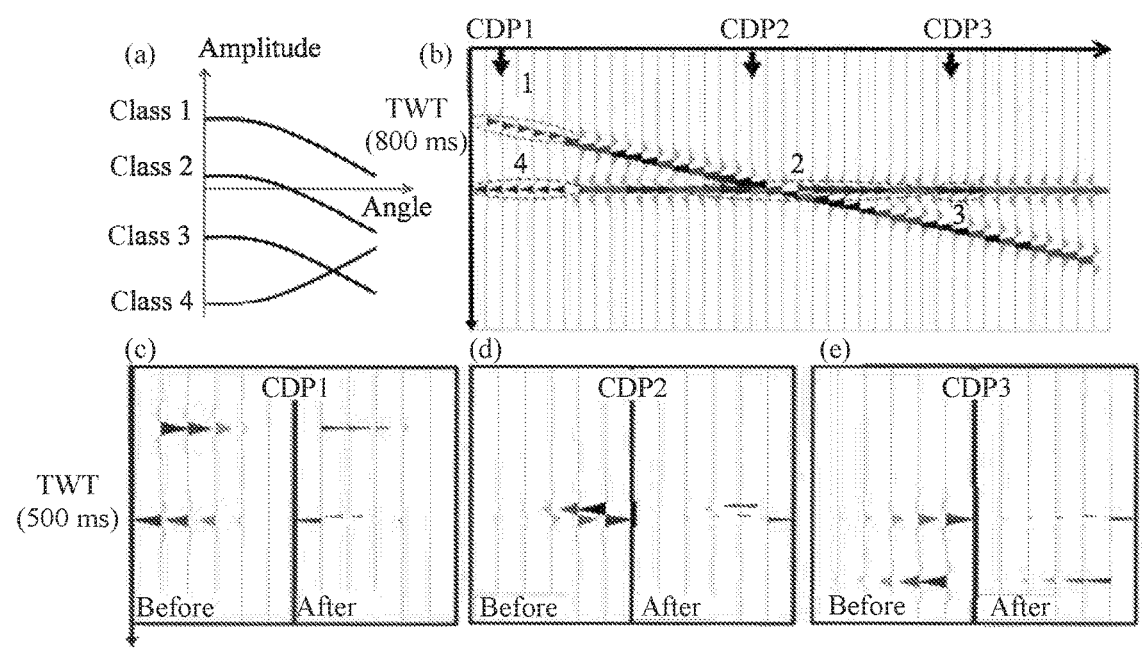
FIG. 2 is a set of graphs illustrating application of an embodiment of method for generating spectrally enhanced seismic data to synthetic data.

In one exemplary application, exemplary methods were used on a pre-stack synthetic wedge model containing the four major AVA classes as illustrated in FIG. 2 at (a). FIG. 2 at (b) illustrates the full angle stack. Each synthetic common depth point (CDP) gather contains 5 traces corresponding to 5, 15, 25, 35, and 45 degrees incidence angles. No wavelet differences have been modelled, the only amplitude changes are due to AVA.

Figure 3:
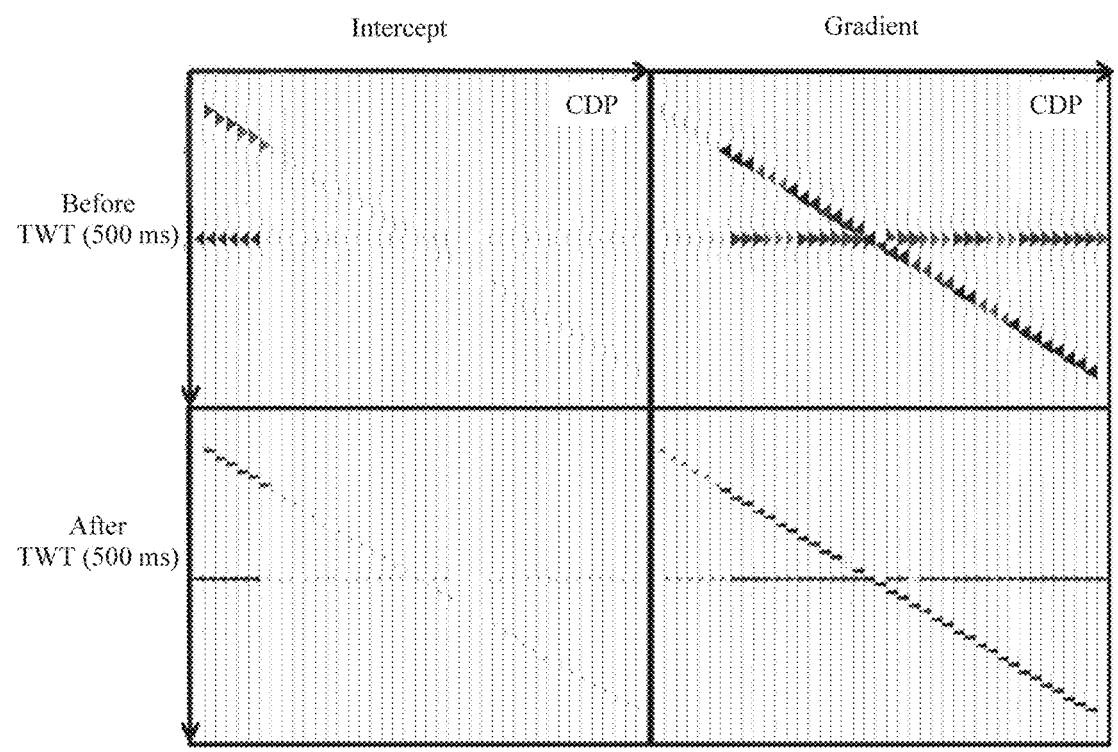
FIG. 3 is a set of graphs illustrating the estimated intercept and gradient.
Figure 4:
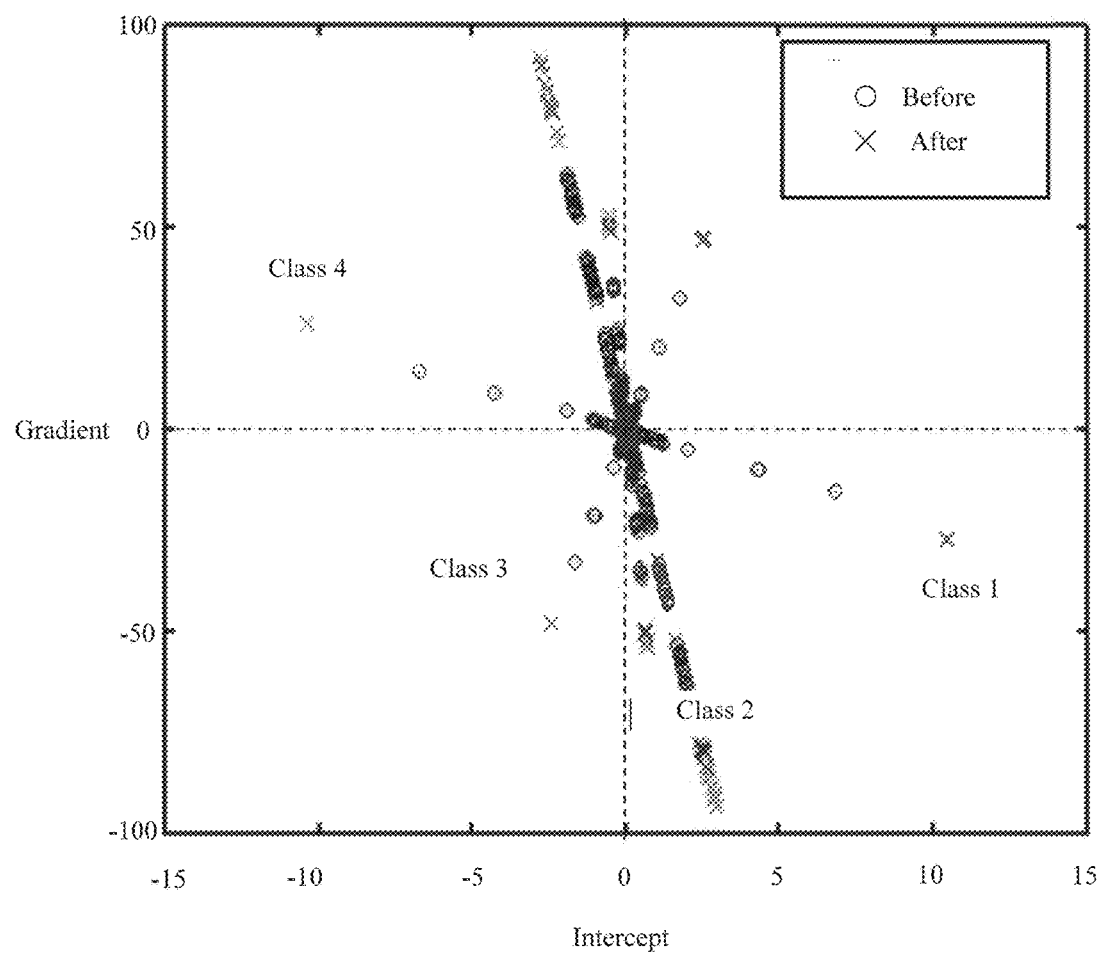
FIG. 4 is a graph illustrating an intercept-gradient cross-plot for the synthetic data model.

FIG. 2 at (c), (d) and (e) illustrates CDP gathers before and after spectral enhancement. To verify AVA compliance of the algorithm, an AVA fit is run on the data before and after bandwidth enhancement. FIG. 3 illustrates the estimated intercept and gradient from which intercept-gradient cross-plots are created before and after bandwidth enhancement. Both the intercept and gradient are scaled by the algorithm after enhancement, which is evident in FIGS. 3 and 4, however no rotation in the intercept-gradient cross-plot is created by the algorithm and relative AVA is clearly preserved for all 4 cases.

Figure 5:
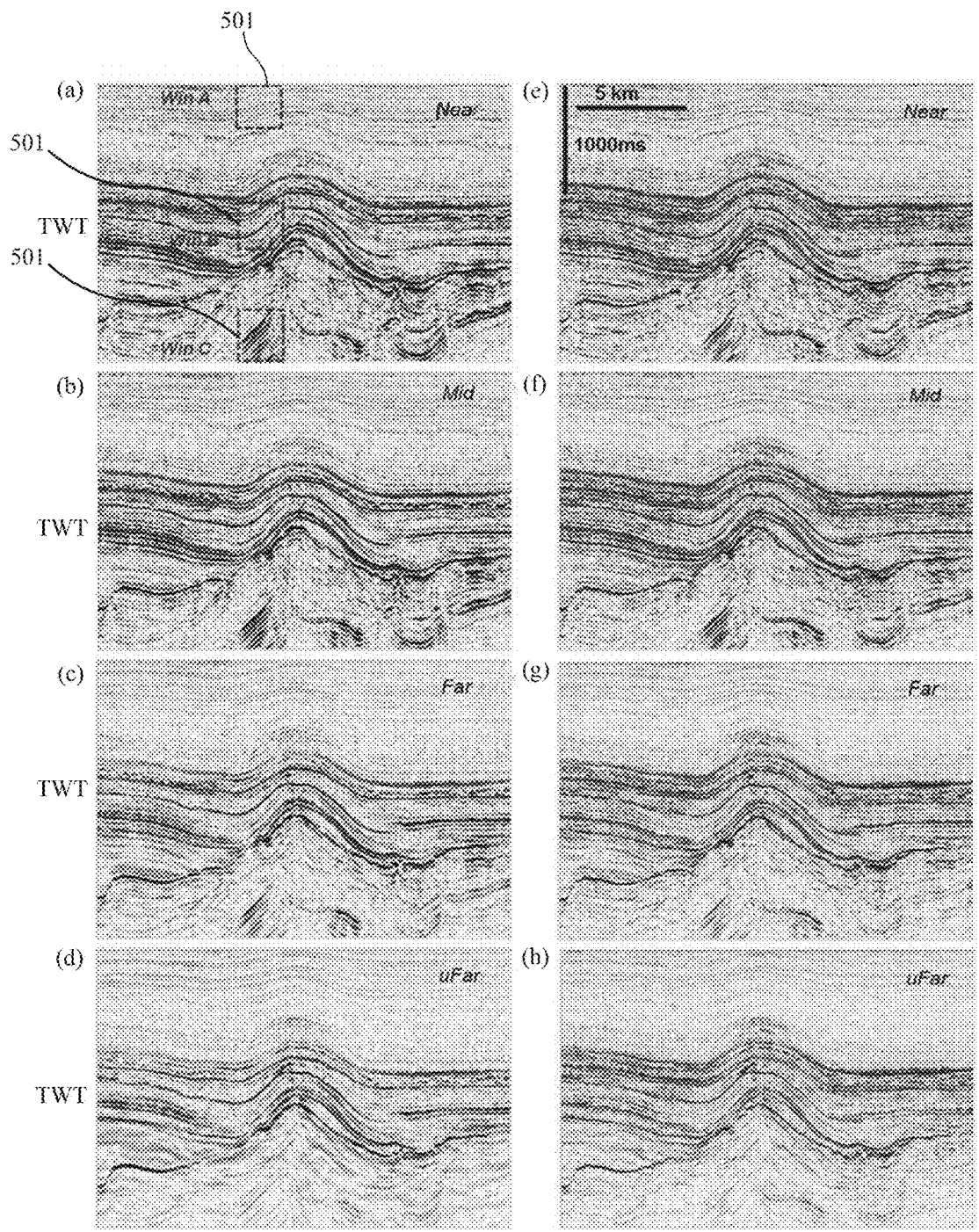
FIG. 5 is a set of graphs illustrating application of an embodiment of a method for generating spectrally enhanced seismic data applied to real seismic data.

In a second exemplary application, exemplary methods were applied to real seismic data obtained from the North Sea. Prior to application of the method, these real seismic data were processed using broadband processing that included source designature/debubble, source and receiver de-ghosting and finally imaged using Kirchhoff pre-stack depth migration. The only absorption compensation applied to the data was a constant phase-only Q-correction before migration. The algorithm was applied to the CDP/angle gathers in the coupled pre-stack mode. The CDP gathers contain 4 traces corresponding to 9, 20, 31, and 39 degrees incidence angles. FIG. 5 at (a)-(d) illustrates the near-, mid-, far- and ultrafar-angle stacks before bandwidth enhancement. The corresponding angle stacks after coupled AVA compliant spectral enhancement are illustrated in FIG. 5 at (e)-(h). These images of the subsurface generated from the enhanced seismic data show that the exemplary methods managed to reduce the side lobes and to enhance the spectra without boosting noise. The spectra of all angle stacks before and after enhancement are shown in FIG. 5 at (a). Despite the algorithm not containing any matching, the AVA cost function leads to better agreeing spectra after the deconvolutions.

Figure 6:
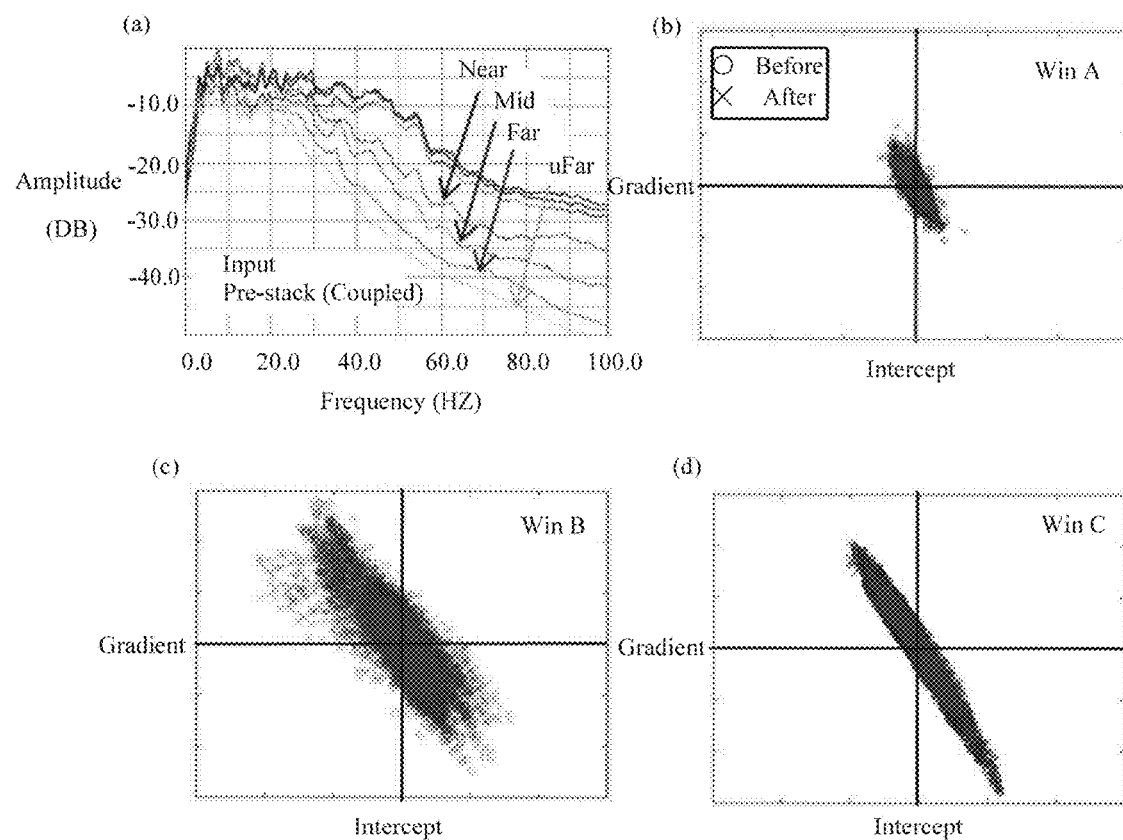
FIG. 6 is a set of graphs illustrating the spectra of near, mid, far and ultra-far seismic data stacks before and after spectral enhancement.

Finally, an AVA fit was run on the data before and after spectral enhancement. Three different windows 501 were used and are illustrated in FIG. 5 at (a). The corresponding AVA intercept-gradient cross-plots are presented in FIG. 6 at (c)-(d). The AVA compliant spectral broadening leads to better focused distributions of points in the cross-plot domain. In window B (FIG. 6 at (c)), where there is the potential of an AVA anomaly, the method can lead to better outlier separation from the background trend.

In accordance with exemplary embodiments, an AVA compliant pre-stack spectral enhancement method is used that applies non-stationary wavelet deconvolution simultaneously on pre-stack angle-gathers and couples the data with an AVA polynomial. Signal preservation is strengthened by options for 3D structural conformity in the deconvolution operators and by the re-use of the noise model in the existing data bandwidth. The non-stationary wavelet de-convolution gives laterally and temporally more stable wavelets across all angles. The performance of the method was illustrated on a synthetic wedge model and real data. The synthetic model confirms the AVA compliance of the approach through focusing the intercept-gradient cross-plots without rotation of the AVA anomalies. It is also possible to apply the method to stack data; however, running in AVA compliant mode followed by stacking improves the quality of the stack image further whilst avoiding boosting of noise and non AVA compliant signal.

In accordance with another exemplary embodiment, bandwidth shrinkage is as:

$$d(t) = w(t) * r(t) \qquad (9)$$

where d(t) is the seismic trace with limited bandwidth, w(t) is the bandwidth shrinkage operator (i.e. encoding residual source signature and absorption) and r(t) is the spiky reflectivity series. In deconvolution processing, the goal is to obtain a spectrum-broadened trace, r'(t), which is closer to the real reflectivity series than d(t) is. The seismic wavelet can be estimated using autocorrelations combined with maximum kurtosis phase, multichannel estimation, or well log information. We do not address methods for estimation of wavelets here, but rather assume the local wavelets that incorporate residual Q effects has been estimated by one of these methods.

Traditional methods to recover the reflectivity from equation (9) are usually performed trace-by-trace. Exemplary embodiments use an inversion with a reweighted sparse regularization to recover the reflectivity from equation (9). In addition, instead of solving the inversion trace-by-trace, joint inversion is performed for the central trace along with its neighbouring traces to better account for coherency along geological structures. In seismic stacks. i.e., migration images, the neighbouring traces are very similar to each other due to the local similarity of the underlying geology and are considered as warped versions of each other. Hence the neighboring traces are related to each other with some linear warping operators $\mathbb{P}_{ij}d_j \approx d_i$, where the warping operator $\mathbb{P}_{ij}$ is a function of the local dip field and $d_j$ and $d_j$ are near traces. In general, the linear warping operators being functions of the local geology.

Therefore, the seismic data are obtained for the subsurface area and the dip field along x and y is calculated from the obtained seismic data. The local zero-phase signature wavelet, $\mathbb{W}$, is estimate from each local three-dimensional (3D) window in the obtained seismic data. Each 3D window includes a plurality of seismic traces in the seismic data. Therefore, a warping operators, $\mathbb{P}_i$, i=1, 2, ..., n are constructed for each trace in the 3D window for n adjacent traces. The warping operator for the central trace is a unitary operator, $\mathbb{P}_{n/2} = \mathbb{I}$. The result is equation (9) expanded as:

$$\begin{pmatrix} d_1 \\ \vdots \\ d_n \end{pmatrix} = \begin{pmatrix} \mathbb{P}_1 \\ \vdots \\ \mathbb{P}_n \end{pmatrix} \mathbb{W}r \qquad (10)$$

where $d_i$ are the neighbouring traces, $d_{n/2}$ is the central trace, and $\mathbb{P}_i$ are the warping operators that convert the central trace to its neighbor i. Again, $\mathbb{P}_{n/2} = \mathbb{I}$, and $\mathbb{W}$ is a matrix to convolve the given wavelet, e.g., the seismic source wavelet. The sharpened version of the central trace, r, (which is the inverted model) is jointly inverted from equation (10) under a reweighted sparse regularization. The processing flow is carried out in a moving 3D window across the entire seismic stack in the obtained seismic data. The reweighting scheme works by iteratively solving equation (11) below by $L^2$ regularization with the updated diagonal matrix, $\mathbb{E}$, in each iteration:

$$\begin{pmatrix} d_1 \\ \vdots \\ d_n \end{pmatrix} = \begin{pmatrix} \mathbb{P}_1 \\ \vdots \\ \mathbb{P}_n \end{pmatrix} \mathbb{W}\mathbb{E}x, \; r = \mathbb{E}x \qquad (11)$$

Initially $\mathbb{E}$ is set to the identity matrix. In the next iteration the diagonal elements of $\mathbb{E}$ are set to the envelope of r from the preceding iteration. Primary events are honoured and unnecessary ringing and noise energy are reduced in each iteration. Data-domain similarity weighting between the central trace and its neighbouring traces can be introduced into equation (11) to avoid smearing across faults. Due to the sparse regularization and structurally conformal constraints introduced by the neighbouring traces, clean and geologically conformal and resolution enhanced results are obtained.

Figure 7:
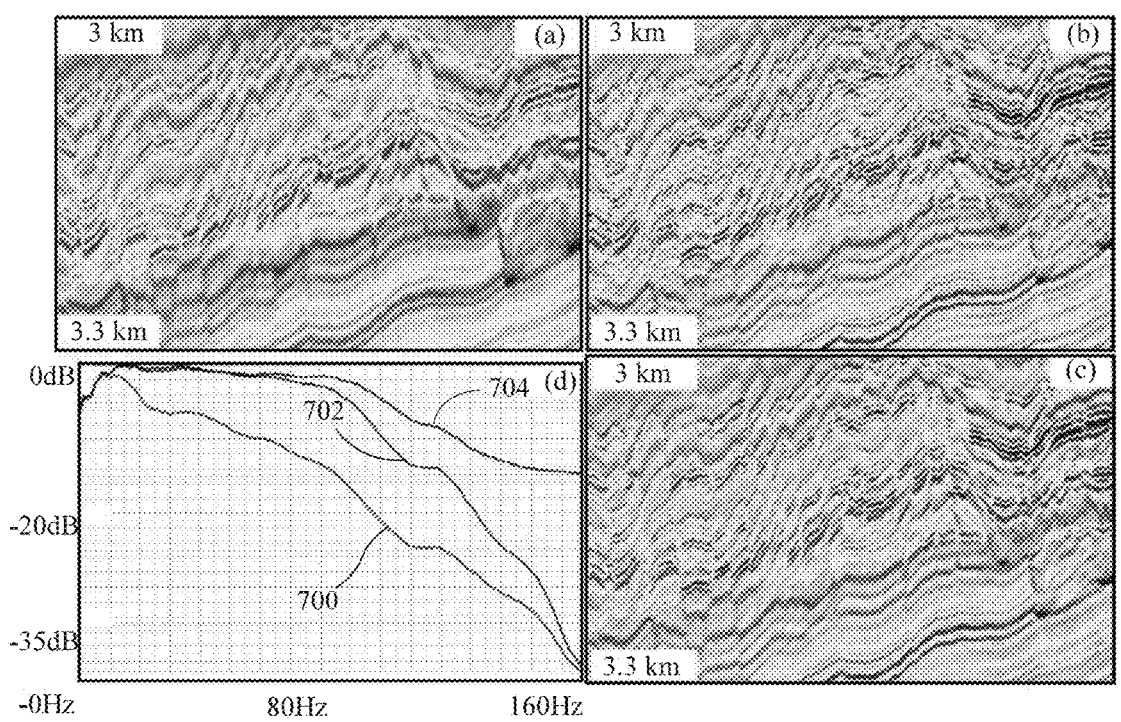
FIG. 7 is a set of graphs illustrating improvements in the spectra of seismic data using another embodiment of a method for generating spectrally enhanced seismic data.

In a first exemplary application, seismic data containing a pre-stack depth migrated stack from offshore West Africa were obtained. These seismic data were acquired in a narrow azimuth (NAZ), variable-depth streamer configuration and had both receiver and source side deghosting applied. Although the ghost notches were removed and the bandwidth was extended accordingly, the spectrum was slanted with a peak frequency shifted towards the low end. FIG. 7 at (a) illustrates a zoom-in section of the stack that containing significant faulting. FIG. 7 at (b) illustrates the resolution enhancement (RE) result with conventional $L^2$ regularization without any structural conformity constraint. Although the events became sharper and the spectrum became broader over the original spectrum 700 as shown the middle line 702 in FIG. 7 at (d), considerable noise was amplified and some events became broken up. By comparison, FIG. 7 at (c) shows the result with the RE method in accordance with exemplary embodiments. The resulting image of the subsurface is cleaner, and the sharpened events are more coherent along the geological structures. The spectrum 704 indicates that more high frequency energy was recovered by the new method.

Figure 8:
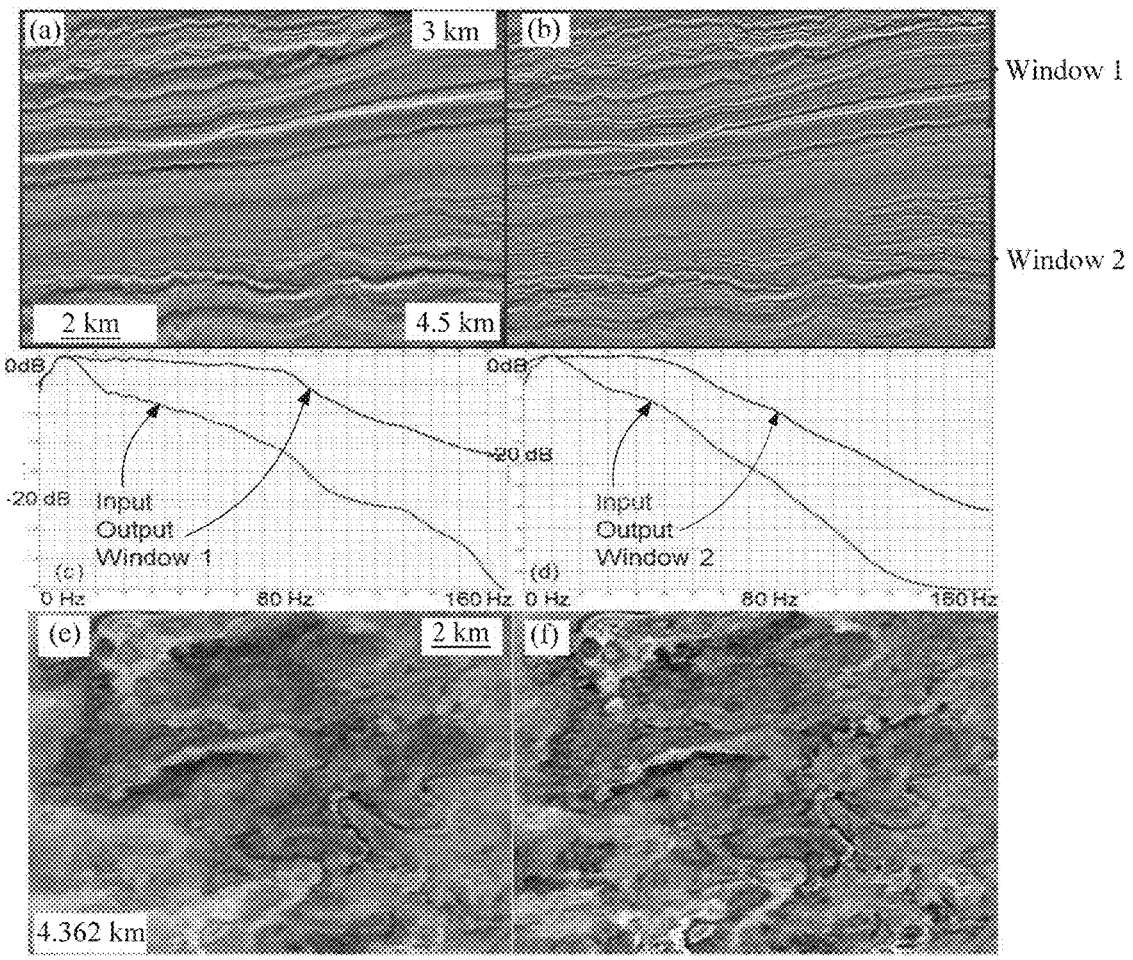
FIG. 8 illustrates seismic data before and after RE using another embodiment of a method for generating spectrally enhanced seismic data.

FIG. 8 illustrates an inline section of the seismic data before (a) and after (b) RE in accordance with exemplary embodiments. FIG. 8 at (c) and (d) illustrates that the spectrum became both broader and flatter at different depths. The structures in the depth slice appear more focused, and more structural details were revealed after the 3D structurally conformal RE, as illustrated in FIG. 8 and (e) and (f).

Figure 9:
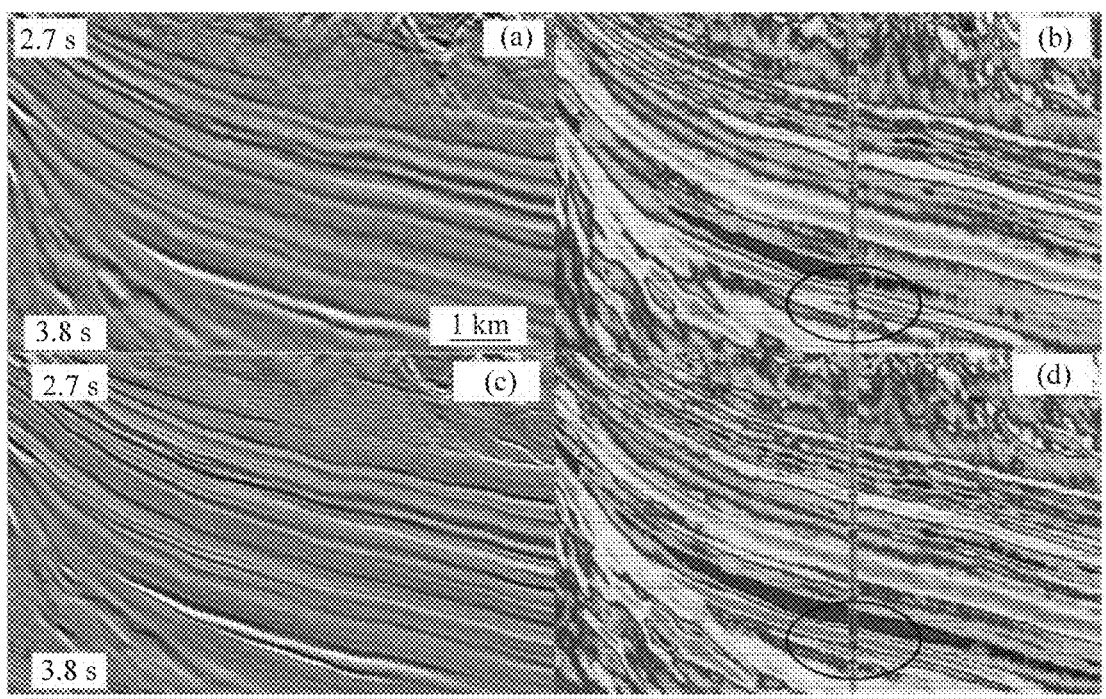
FIG. 9 illustrates input seismic data and impedance maps before and after RE.

Improving quantitative interpretation is a goal of broadening the seismic spectrum and enhancing resolution. In a second data set, the impact of the method on impedance inversion of the seismic stack is demonstrated. FIG. 9 at (a) illustrates the depth-migrated stack, stretched to time, from the East Breaks area of the Gulf of Mexico. The seismic data were acquired using a flat-tow NAZ acquisition. FIG. 9 at (b) illustrates the corresponding inverted impedance map. FIG. 9 at (c) illustrates the more coherent and broadband seismic after the 3D structurally conformal RE. A more coherent and detailed impedance map was obtained based on the resolution enhanced seismic as shown in FIG. 9 at (d). Examining the target region around 3.5 sec shows that the inverted impedance better matches the impedance well log after RE with the structurally conformal method.

Systems and methods in accordance with this embodiment utilize a resolution enhancement that incorporates joint sparse inversion and a 3D structure conformity constraint. Due to the sparsity regularization, the method achieves good discrimination against noise energy. High frequency signals are boosted while the noise energy in the same band is suppressed. The 3D structural conformity constraint helps preserve the conformity of the resolution enhanced output with the geological structures. After RE with this method, the enhanced seismic data have not only broader bandwidth and higher resolution, but also a higher signal-to-noise ratio and improved coherence along events. The enhanced resolution and improved coherence may lead to better seismic inversion of acoustic impedance with finer spatial resolution and higher geological coherence.

One exemplary embodiment is directed to a post-migration, post-stack, amplitude-only Q compensation in the time domain. This method may be extended in by application of the method in the depth domain, application of the method including phase effects due to Q, application of the method on post-migration, pre-stack or post-stack data including surface-offset data, sub-surface offset data, surface angle data, sub-surface angle data, partially migrated data (for example contribution of a sub-set of shots to the migration) and angle stack data among others, application of the method on pre-migration data, inclusion of the method within a Q migration algorithm, inclusion of the method within a least squares migration algorithm, including conjugate gradients and inverse Hessian.

Exemplary embodiments can utilize any suitable migration algorithm. Suitable migration algorithms include, but are not limited to, Kirchhoff migration, beam migration (CBM, Gaussian beam, etc.), wave equation migration (one way, RTM, etc.) and Q-migration, multiple migration. When Q compensation is applied on pre-stack data, normal moveout (NMO) correction is not applied to the seismic data at the point where the Q compensation is applied as this better represents the increased travel time (and therefore absorption) experienced by further offsets. In the case of pre-stack migrated data, NMO may be removed prior to correction and applied again after correction. Alternatively, in the case of pre-stack migrated data, a partial NMO may be removed from the data prior to Q compensation, to represent better still the increased travel time and absorption experienced by further offsets as described, for example, in Xia, G. "Proper time-referencing for prestack Q estimation and compensation". 67$^{th}$ EAGE Conference & Exhibition, Extended Abstract (2005). The partial NMO may be removed prior to Q compensation and applied again after correction.

The general mathematical formulation of the Q compensation problem addressed by the method is the equation:

$$d = Lm \qquad (12)$$

where $L = L_A L_M$ and d is the input or obtained seismic data from the subsurface (without Q compensation) in the data domain. The variable m is an (unknown) dataset in some model domain. $L_M$ is a known linear operator encoding a transformation from the model domain to the data domain, and $L_A$ is a known linear operator encoding an amplitude attenuation effect corresponding to a particular Q absorption model, for example:

$$A(x,y,f,t) = A_0(x,y,f,t) e^{-\pi f t / Q(x,y,t)} \qquad (13)$$

where $A_0$ and A are, respectively, the amplitudes before and after attenuation of temporal frequency f at time t. The coordinates x and y describe the surface locations corresponding to the seismic data.

In the case that the model domain is chosen to be the 3D linear Radon domain, $L_M$ is defined in terms of the frequency domain 3D linear least-squares Radon transform, $L_R$, viz.

$$L_R(f) = e^{-2\pi i f (x(i) p_x(j) + y(i) p_y(j))}$$

where $L_R(f)$ effects the reverse tau-$p_x$-$p_y$ transform for a given frequency slice, f. The values i and j index the traces respectively in the data and model domains. The slownesses in the x and y directions are given by $p_x$ and $p_y$ respectively. In practice, $L_R(f)$ may be applied on data in the frequency domain following a forward Fourier transform, the results then being transformed back to the time domain by a corresponding inverse Fourier transform after application of $L_R(f)$ for each frequency. $L_M$ includes both the frequency-dependent application of $L_R$ and the forward and inverse Fourier transforms.

The inversion problem described by equation (12) may then be solved for m. The solution may be found in a least squares sense or by using sparse inversion, for example by Iteratively Re-weighted Least Squares as described, for example, in Trad, D. et al., "Latest Views of the Sparse Radon Transform", Geophysics, 68, pp. 386-399 (2003). The 3D linear Radon domain is a plane wave decomposition and allows spatially consistent signal to be discriminated from incoherent noise. Hence, application of sparseness weights in the model domain may be used to promote coherent signal and penalize incoherent noise in the inversion. Equation (12) may be modified to denote explicitly the use of sparseness weights, W, as:

$$d = LWm \qquad (14)$$

In this example, it is noted that the sparseness weights are applied in the model domain. Sparseness weights may also be applied in the data domain. Examples of how W may be calculated are described below.

Upon solving equation (12) form in the model domain, the final Q compensated result, $d_c$, in the data domain, is easily obtained:

$$d_c = L_M Wm$$

The choice of the 3D linear Radon domain as a model domain also encourages the spatial consistency of $d_c$ across geological structures.

In one embodiment, the spectral shifting experienced is accounted for by steeply dipping events in a conventional migration procedure. For a signal corresponding to a seismic event with 3D dip magnitude, θ, it was noted in Lin et al., "Spectral Decomposition of Time vs. Depth-Migrated Data", 83$^{rd}$ Annual International Meeting, SEG, Expanded Abstracts, 1384-1388 (2013) that on migrated data apparent frequencies, $f_a$, are related to the true frequencies, f, of the signal by the equation:

$$f = \frac{f_a}{\cos(\theta)} = f_a \sqrt{1 + \sigma_x^2 + \sigma_y^2} = f_a g(p_x, p_y) \qquad (15)$$

where the geological slownesses, $\sigma_x$ and $\sigma_y$, are related to the time domain slownesses, $p_x$ and $p_y$, by the function g. In general, g will be related to a known velocity field used to convert the signal between the time domain and the depth domain. The velocity field may be assumed to be locally isotropic in space.

Substitution of equation (15) into equation (13) yields an absorption model that varies with the time domain slownesses, $p_x$ and $p_y$:

$$A(x, y, f_a, t, p_x, p_y) = A_0(x, y, f_a, t) e^{-\frac{\pi f_a t}{Q(x,y,t)} g(p_x, p_y)} \qquad (16)$$

Equation (14) can then be modified to describe a Q compensation problem which is consistent with geological dip:

$$d = \Sigma_{p_x, p_y} L_A(p_x, p_y) L_M(p_x, p_y) Wm \qquad (17)$$

where $L_A(p_x, p_y)$ is the linear operator corresponding to the slowness-dependent absorption model (16), and $L_M(p_x, p_y)$ is an operator analogous to $L_M$, but which transforms only data corresponding to a particular dip, ($p_x$, $p_y$), from the model domain to the data domain.

Solving (17) for m, again by sparse inversion, then computing the final Q compensation result in the data domain:

$$d_c = \sum_{p_x, p_y} L_A(p_x, p_y) L_M(p_x, p_y) Wm$$

results in a spatially consistent Q compensation respecting true geological dip.

Although described in the context of the 3D tau-$p_x$-$p_y$ domain, other domains may also be used. Examples of other domains include, but are not limited to the tau-$p_x$-$p_y$-$p_h$ domain ($p_h$ representing slowness in the offset direction), the tau-$p_x$-$p_y$-$p_{hx}$-$p_{hy}$ domain ($p_{hx}$ and $p_{hy}$ representing the slownesses in the offset-x and offset-y directions), the tau-$p_x$-$p_y$-$p_h$-$p_{az}$ domain ($p_{az}$ representing the variation in the azimuthal direction), the f-$k_x$-$k_y$ domain, the curvelet domain, the wavelet domain, the complex wavelet domain, the ridgelet domain, the contourlet domain and another Radon domain.

As described above, in one embodiment, the method is part of a least squares migration approach. In such an approach, the model domain may be the image domain, and the data domain may be the recordings in the unmigrated space-time domain. The linear operator in this example would include a reverse migration.

The inversion problem may be solved using a variety of norms (e.g. L2, L1, L0, Nuclear, Cauchy norm) and via a number of different algorithms. Suitable algorithms include, but are not limited to, the conjugate-gradient (CG) method, LU decomposition, the method of steepest descent and the Cholesky factorization. For algorithmic efficiency, a CG algorithm may be used, which is initialized by a solution corresponding to a conventional, 1D Q compensation.

Taking the example of a CG solver, a linear operator is defined to perform the transformation from the model domain to data domain, including the absorption effect. In accordance with this embodiment, seismic data in tau-$p_x$-$p_y$ are inputted. Sparseness weights, W, are applied and the seismic data are transformed to the frequency domain via a Fourier transform. A loop is then made through a plurality of frequencies. For each frequency, a reverse tau-$p_x$-$p_y$ operator, LR, is applied for all ($p_x$,$p_y$) values simultaneously. The seismic data are then transformed back to the time domain via an inverse Fourier transform and a time variant linear operator corresponding to the absorption model, equation (13), is applied to each trace in the data domain.

The number of iterations used in the conjugate gradient algorithm may be fixed, after testing by the user. Alternatively, the number of iterations may vary based on when the residual or the change in residual goes below a pre-defined percentage.

In an embodiment where a dip-consistent compensation is required, the workflow in the method is modified. Seismic data in tau-$p_x$-$p_y$ are inputted, and sparseness weights, W, are applied. A loop is then executed through the slownesses, $p_x$ and $p_y$. In this loop, for each ($p_x$, $p_y$) the seismic data are transformed to the frequency domain via a Fourier transform. A loop is then made through a plurality of frequencies. For each frequency, a reverse tau-$p_x$-$p_y$ operator is applied for the current slowness values. The seismic data are then transformed back to the time domain via an inverse Fourier transform. Geological slowness is calculated based on the function g as described above. A linear operator corresponding to the absorption model, equation (16) is then applied to each trace in the data domain. Following the loop over all slownesses, a summation is conducted over all slownesses ($p_x$,$p_y$).

The adjoint operator, also required for the inversion, is easily determined for a known forward operator.

These workflows may be modified in order to improve efficiency. For example, in the case of the dip-consistent workflow described above, if the velocity field describing the data is locally isotropic in space then the function g in equation (16) depends on the sum $p_x^2 + p_y^2$ but not on $p_x$,$p_y$ individually. The outermost loop described above may then be carried out over values of $p_x^2 + p_y^2$, instead of over all values of ($p_x$,$p_y$). Further efficiency improvements may be obtained by transforming small blocks of adjacent $p_x^2 + p_y^2$ values simultaneously, and regarding the value of $p_x^2 + p_y^2$ across the block to be constant, based on a single representative value for the block.

The absorption operator, $L_A$, is applied in the data domain. However, the absorption models in equations (13) and (16) are functions of both time and frequency. Hence, in general, the absorption operator $L_A$ operates in the time domain, the frequency domain, or a combination of the two. An example workflow describing $L_A$ includes inputting seismic trace data in the data domain and initializing an output trace to be zero everywhere. The input seismic trace data are transformed to the frequency domain via a Fourier transform, and a loop is performed over all time values, t. For each time value, t, the absorption function provided in equation (13) or equation (16) is applied to the seismic data transformed into the frequency domain as a function of f. The result of applying the absorption function to the seismic data in the frequency domain is then transformed back into the time domain via an inverse Fourier transform. The output seismic trace is then populated at time t with the value of the absorption function transformed back into the time domain at time t. An analogous workflow may be described in which the loop is carried out over frequencies rather than times or, alternatively, a combination of the frequencies and times.

Modifications to the workflow described above may be made to improve efficiency. For example, by assuming that the absorption effects are locally invariant in time, the loop over the time variables may be carried out over blocks of samples rather than every time sample individually, with the time value given in equation (13) or equation (16) taken to be a single constant representative of the block. Similar assumptions may be made for frequency blocks in the case that the loop is carried out over all frequencies. In one embodiment, a further improvement in efficiency is accomplished by incorporating the forward Fourier transform of the input seismic data into the loop, but limiting its extent to a small time window in the region of the time sample of interest.

Exemplary embodiments for choosing sparseness weights, W, for the inversion including initializing the sparseness weights, W, to 1 everywhere. Then the sparseness weights, W, are updated according to the following loop, which is conducted for a predefined number of iterations. A weighted least squares problem (equation (14) or equation (17)) is solved for current sparseness parameters. The envelope of this solution is then taken, with smoothing if required, for example by raising the envelope to a power, e.g., a pre-defined power. The sparseness weights, W, are updated to be equal to this smoothed envelope. These steps are repeated as desired, beginning with solving the weighted least squares problem.

In one embodiment, the effectiveness of sparseness in the inversion is improved by working in numerous, independent processing windows in the data domain (both in space, x/y, and/or time, t) as opposed to inverting for the entire input dataset simultaneously. This reduces the complexity of the model domain, enabling a more effective separation of slownesses and allowing the sparseness to better distinguish between coherent signal and incoherent noise.

While the sparseness may be derived from the data being compensated, the sparseness weights may also be calculated on a second dataset. For example, the sparseness weights may be calculated on a rolling stack and used in the inversion of a single offset in the center of the rolling stack. Alternatively, the sparseness weights may be derived on a dataset after de-noise and applied to the corresponding dataset before de-noise. Alternatively the sparseness weights may be derived on one vintage of a time-lapse project and applied to a second vintage in a time-lapse project. Other options include datasets acquired in different directions (azimuths) or with different y-offsets (e.g. wide-azimuth datasets). The datasets may relate to towed streamer, land, ocean bottom streamer (OBS) or transition zone projects. The towed streamer datasets may relate to the same or different towing depths. For example, sparseness weights may be derived on a horizontal tow dataset acquired in a first direction and used for the Q-compensation of a variable depth streamer dataset acquired in a second direction. The first and second directions may be orthogonal (at 90 degrees) to each other, or may be in different directions.

While described by the sequential application of two linear operators, it should be understood that in some cases the operators may be combined. For example, coefficients relating to the reverse slant stack may be combined with coefficients relating to the absorption correction. Alternatively, the method operates on the reverse slant stack for a sub-set of slowness traces rather than on the reverse slant stack of all slowness traces.

Any residual not described by the model may be discarded or processed. For example the residual may be processed with a standard Q-compensation filter, for example with a specified decibel limit to avoid over-boosting, which may then be added to the Q compensated data obtained from the sparse inversion.

In one embodiment, other linear operators are added into any of the embodiments discussed herein. For example, in the case where the model of the data is defined by AVO parameters, e.g., $R_0$ and G. A linear operator may act on the AVO parameters to generate pre-stack data, for example, offset volumes or angle gathers, which are subsequently processed by an absorption operator as part of a combined linear process. Other linear operators include, but are not limited to, re-ghosting, re-signature and re-multiple. In one embodiment, the method is combined with other resolution enhancement processes, such as spiking deconvolution. For example, this could relate to an iterative non-linear process as described below whereby the linear operators relating to convolution by a de-spiking operator and Q-absorption are combined into one process. The spiking deconvolution operator is initialized to a spike, and the combined Q-compensation/spiking deconvolution (e.g. sparse) inversion is applied. The spiking deconvolution operator on the output of applying the combined q-compensation/spiking deconvolution. The method then returns to the step of applying the combined Q-compensation/spiking deconvolution.

While the description of this approach has been given in a mixture of frequency and time domain notations, the implementation of the approach may be modified from this notation for computational efficiency. For example, multiplications in the frequency domain may be achieved by convolutions in the time domain and vice-versa.

In accordance with one exemplary embodiment, seismic data affected by absorption in the subsurface are received or obtained. A linear inversion is performed on the seismic data to derive a model of the input seismic data. Preferably, the linear inversion is a sparse inversion which encodes an absorption. The derived model is used to create an image of the subsurface. In one embodiment, the sparse inversion weights are a function of the input data. In this embodiment, the sparseness weights are iteratively updated, are in the same domain as the input data, are in the same domain as the model or are in the time domain, frequency domain, or in the time and frequency domains. In one embodiment, the inversion operates on a spatial window of the input data. In one embodiment, the input seismic data are in a migrated domain or the input seismic data are obtained before migration. In one embodiment, the migrated domain is in depth or time.

In accordance with another embodiment, seismic data are obtained or received in a space-time domain affected by absorption in the subsurface. A linear inversion is performed to derive a model of the input data. In one embodiment, the model is in a domain other than the space-time domain and the linear inversion encodes an absorption. The model is used to create an image of the subsurface. In one embodiment, the image is created where the inversion operates on a spatial window of the input data. In one embodiment, the model describes the variation of the input data in at least one direction in space. In one embodiment, the model is in a tau-p domain.

Figure 10:
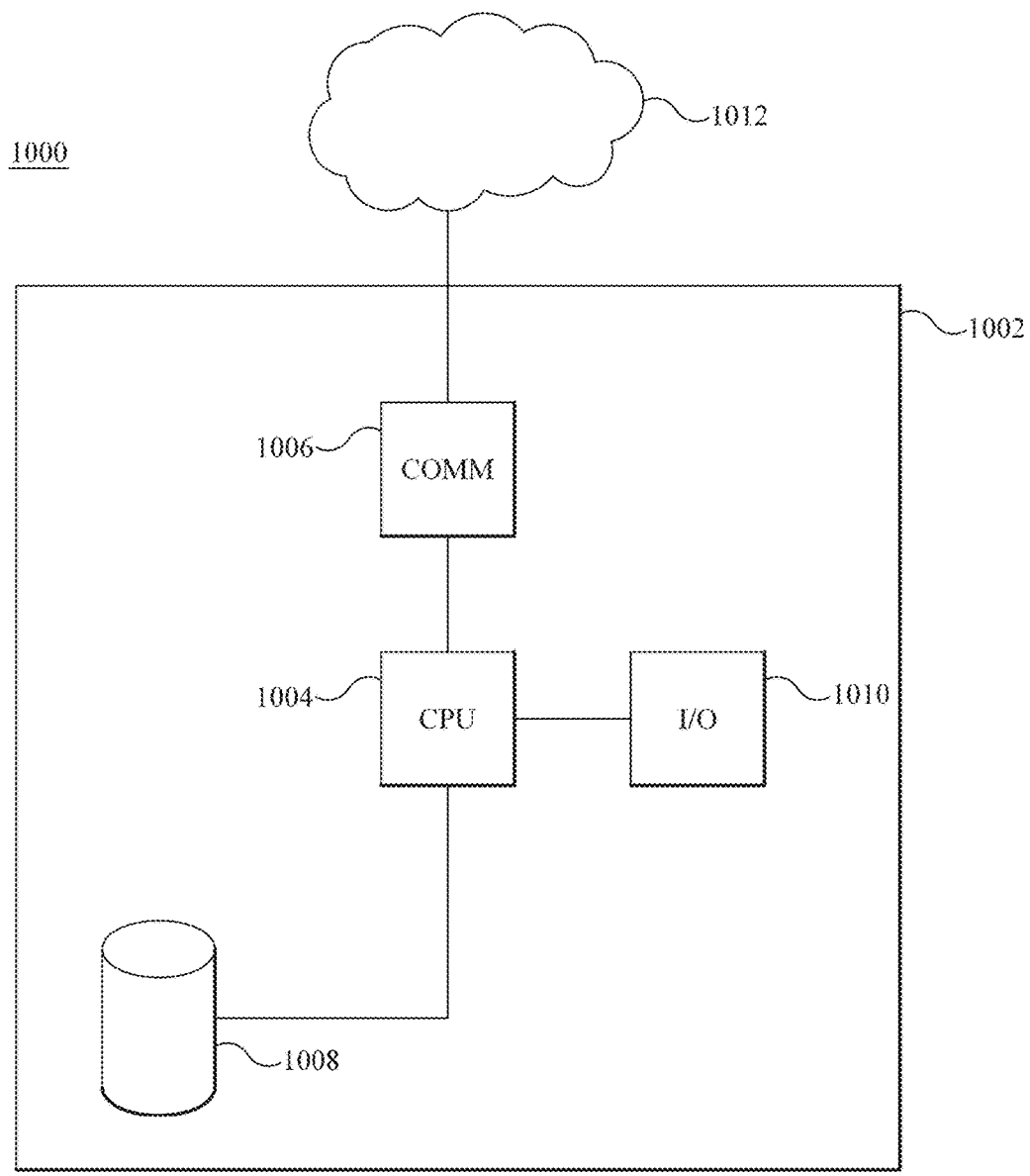
FIG. 10 is a schematic representation of an embodiment of a computing system for generating spectrally enhanced seismic data.

In accordance with another embodiment, seismic data affected by absorption in the subsurface are obtained or received. A linear inversion is performed to derive a model of the input data. In one embodiment, the linear inversion encodes an absorption as a function of geological dip. The model is used to create an image of the subsurface. In one embodiment, the image of the subsurface is created where encoding an absorption relates to the wavelet perpendicular to a migrated event Referring now to FIG. 10, exemplary embodiments are directed to a computing system 1000 for generating spectrally enhanced seismic data. In one embodiment, a computing device for performing the calculations as set forth in the above-described embodiments may be any type of computing device capable of obtaining, processing and communicating seismic data and spectrally enhanced seismic data associated with seismic surveys. The computing system 1000 includes a computer or server 1002 having one or more central processing units 1004 in communication with a communication module 1006, one or more input/output devices 1010 and at least one storage device 1008.

The communication module is used to obtain seismic data recorded from a subsurface. These recorded seismic data can be obtained, for example, through the input/output devices. The recorded seismic data for the subsurface are stored in the storage device. The input/output device can also be used to communicate or display the resulting three dimensional image of the subsurface, for example, to a user of the computing system, or the spectrally enhanced seismic data.

The processor is in communication with the communication module and storage device and is configured to express the seismic data as a convolution of reflectivity and a seismic source wavelet, the seismic source wavelet varying over a sampling interval and defining a total amount of energy over the sampling interval and containing a time-dependent convolutional wavelet matrix comprising a plurality of time-dependent and angle-dependent wavelets. The processor is further configured to identify an enhanced seismic source wavelet having a single-valued energy spike that yields the total amount of energy over the sampling interval and to convolute he reflectivity with the enhanced seismic source wavelet to generate spectrally enhanced seismic data. In one embodiment, the processor is further configured to include linearized amplitude variation with angle coefficients in the reflectivity to preserve amplitude variation with angle in the spectrally enhanced seismic data and to modify reflectivity in accordance with an applied structural consistency in the subsurface to reduce noise in the spectrally enhanced seismic data. In order to identify the enhanced seismic source wavelet, the processor, calculates an area under the seismic source wavelet over the sampling interval and identifies the enhanced seismic source wavelet to enclose the area over the sampling interval. In one embodiment, the processor after convoluting the reflectivity with the enhanced seismic source wavelet to generate spectrally enhanced seismic data adds residual energy representing noise in the seismic data to the convolution of the reflectivity and the enhanced seismic wavelet to generate spectrally enhanced seismic data.

Suitable embodiments for the various components of the computing system are known to those of ordinary skill in the art, and this description includes all known and future variants of these types of devices. The communication module provides for communication with other computing systems, databases and data acquisition systems across one or more local or wide area networks 1012. This includes both wired and wireless communication. Suitable input/output devices include keyboards, point and click type devices, audio devices, optical media devices and visual displays.

Suitable storage devices include magnetic media such as a hard disk drive (HDD), solid state memory devices including flash drives, ROM and RAM and optical media. The storage device can contain data as well as software code for executing the functions of the computing system and the functions in accordance with the methods described herein. Therefore, the computing system 1000 can be used to implement the methods described above associated with using an offset vector tile gather to image a subsurface. Hardware, firmware, software or a combination thereof may be used to perform the various steps and operations described herein.

Methods and systems in accordance with exemplary embodiments can be hardware embodiments, software embodiments or a combination of hardware and software embodiments. In one embodiment, the methods described herein are implemented as software. Suitable software embodiments include, but are not limited to, firmware, resident software and microcode. In addition, exemplary methods and systems can take the form of a computer program product accessible from a computer-usable or computer-readable medium providing program code for use by or in connection with a computer, logical processing unit or any instruction execution system. In one embodiment, a machine-readable or computer-readable medium contains a machine-executable or computer-executable code that when read by a machine or computer causes the machine or computer to perform a method for generating spectrally enhanced seismic data and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages.

As used herein, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums and include non-transitory computer-readable mediums. Suitable computer-readable mediums include, but are not limited to, a semiconductor or solid state memory, magnetic tape, a removable computer diskette, a random access memory (RAM), a read-only memory (ROM), a rigid magnetic disk and an optical disk. Suitable optical disks include, but are not limited to, a compact disk-read only memory (CD-ROM), a compact disk-read/write (CD-R/W) and DVD.

The disclosed exemplary embodiments provide a computing device, software and method for method for generating spectrally enhanced seismic data. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software, or firmware tangibly embodied in a computer-readable storage medium for execution by a geophysics dedicated computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for generating spectrally enhanced seismic data, the method comprising:
   obtaining seismic data for a subsurface;
   modelling the seismic data as linear function of a reflectivity and a seismic source wavelet, the seismic source wavelet varying over a sampling interval;
   determining an enhanced seismic source wavelet comprising a single-valued spike that preserves wavelet energy; and convoluting the reflectivity with the enhanced seismic
source wavelet to generate spectrally enhanced seismic
data,
wherein the modelling the seismic data is constrained by
an amplitude variation with reflection angle.

2. The method of claim 1, wherein the method further comprises compensating the seismic data for subsurface absorption using a sparse inversion.

3. The method of claim 1, wherein the method further comprises solving the expressed function of reflectivity and the seismic source wavelet using non-stationary estimates of time-dependent and angle-dependent wavelets and a sparse inversion algorithm to generate an estimated reflectivity.

4. The method of claim 1, wherein the method further comprises including linearized amplitude variation with angle coefficients in the reflectivity to preserve amplitude variation with angle in the spectrally enhanced seismic data.

5. The method of claim 1, wherein the seismic source wavelet comprises a time-dependent convolutional wavelet matrix comprising a plurality of time-dependent and angle-dependent wavelets.

6. The method of claim 1, wherein the determining of the enhanced seismic source wavelet comprises:
calculating an area under the seismic source wavelet over the sampling interval; and
identifying the enhanced seismic source wavelet to enclose the area over the sampling interval.

7. The method of claim 1, wherein convoluting the reflectivity with the enhanced seismic source wavelet to generate spectrally enhanced seismic data further comprises adding residual energy representing noise in the seismic data to the convolution of the reflectivity and the enhanced seismic wavelet to generate spectrally enhanced seismic data.

8. A non-transitory computer-readable medium containing computer-executable code that when read by a computer causes the computer to perform a method for generating spectrally enhanced seismic data, the method comprising:
obtaining seismic data for a subsurface;
modelling the seismic data as linear function of a reflectivity and a seismic source wavelet, the seismic source wavelet varying over a sampling interval;
determining an enhanced seismic source wavelet comprising a single-valued spike that preserves wavelet energy; and
convoluting the reflectivity with the enhanced seismic source wavelet to generate spectrally enhanced seismic data,
wherein the modelling the seismic data is constrained by an amplitude variation with reflection angle.

9. The non-transitory computer-readable medium of claim 8, wherein the method further comprises solving the expressed function of reflectivity and the seismic source wavelet using non-stationary estimates of time-dependent and angle-dependent wavelets and a sparse inversion algorithm to generate an estimated reflectivity.

10. The non-transitory computer-readable medium of claim 8, wherein the method further comprises including linearized amplitude variation with angle coefficients in the reflectivity to preserve amplitude variation with angle in the spectrally enhanced seismic data.

11. The non-transitory computer-readable medium of claim 8, wherein the method further comprises modifying reflectivity in accordance with an applied structural consistency in the subsurface to reduce noise in the spectrally enhanced seismic data.

12. The non-transitory computer-readable medium of claim 8, wherein the method further comprises compensating the seismic data for subsurface absorption using a sparse inversion.

13. The non-transitory computer-readable medium of claim 8, wherein the determining of the enhanced seismic source wavelet comprises:
calculating an area under the seismic source wavelet over the sampling interval; and
identifying the enhanced seismic source wavelet to enclose the area over the sampling interval.

14. The non-transitory computer-readable medium of claim 8 wherein convoluting the reflectivity with the enhanced seismic source wavelet to generate spectrally enhanced seismic data further comprises adding residual energy representing noise in the seismic data to the convolution of the reflectivity and the enhanced seismic wavelet to generate spectrally enhanced seismic data.

15. A computing system for generating spectrally enhanced seismic data, the computing system comprising:
a storage device comprising recorded seismic data for a subsurface; and
a processor in communication with the storage device and configured to:
model the seismic data as linear function of a reflectivity and a seismic source wavelet, the seismic source wavelet varying over a sampling interval;
determine an enhanced seismic source wavelet comprising a single-valued spike that preserves wavelet energy; and
convolute the reflectivity with the enhanced seismic source wavelet to generate spectrally enhanced seismic data,
wherein modelling the seismic data is constrained by an amplitude variation with reflection angle.

16. The computing system of claim 15, wherein the processor is further configured to include linearized amplitude variation with angle coefficients in the reflectivity to preserve amplitude variation with angle in the spectrally enhanced seismic data.

17. The computing system of claim 15, wherein the processor is further configured to modify reflectivity in accordance with an applied structural consistency in the subsurface to reduce noise in the spectrally enhanced seismic data.

18. The computing system of claim 15, wherein the seismic source wavelet comprises a time-dependent convolutional wavelet matrix comprising a plurality of time-dependent and angle-dependent wavelets.

19. The computing system of claim 15, wherein the processor in determining the enhanced seismic source wavelet:
calculates an area under the seismic source wavelet over the sampling interval; and
identifies the enhanced seismic source wavelet to enclose the area over the sampling interval.

20. The computing system of claim 15, wherein the processor after convoluting the reflectivity with the enhanced seismic source wavelet to generate spectrally enhanced seismic data adds residual energy representing noise in the seismic data to the convolution of the reflectivity and the enhanced seismic wavelet to generate spectrally enhanced seismic data.

* * * * *